(12) United States Patent
Flick

(10) Patent No.: US 10,420,440 B2
(45) Date of Patent: Sep. 24, 2019

(54) FIRE COOKING GRILL

(71) Applicant: Mark J. Flick, Milladore, WI (US)

(72) Inventor: Mark J. Flick, Milladore, WI (US)

( * ) Notice: Subject to any disclaimer, the term of this patent is extended or adjusted under 35 U.S.C. 154(b) by 281 days.

(21) Appl. No.: 15/369,352

(22) Filed: Dec. 5, 2016

(65) Prior Publication Data

US 2017/0265679 A1  Sep. 21, 2017

Related U.S. Application Data

(60) Provisional application No. 62/262,785, filed on Dec. 3, 2015.

(51) Int. Cl.
    *A47J 33/00*    (2006.01)
(52) U.S. Cl.
    CPC ..................... *A47J 33/00* (2013.01)
(58) Field of Classification Search
    CPC ........ A47J 33/00; A47J 37/07; A47J 37/0704; A47J 37/073; A47J 2037/0795
    See application file for complete search history.

(56) References Cited

U.S. PATENT DOCUMENTS

| 3,067,734 | A   | * | 12/1962 | Lucas       | A47J 37/0763 126/30 |
| 7,588,027 | B2  | * | 9/2009  | McNeely     | A47J 37/0772 126/25 A |
| 2006/0016381 | A1 | * | 1/2006  | Schultz     | B63B 15/00 114/361 |
| 2008/0184980 | A1 | * | 8/2008  | Czajkoski   | F24B 1/182 126/30 |
| 2010/0319674 | A1 | * | 12/2010 | Schneidewend | A47J 33/00 126/30 |

* cited by examiner

*Primary Examiner* — David J Laux
(74) *Attorney, Agent, or Firm* — Rathe Lindenbaum LLP

(57) ABSTRACT

A fire cooking grill includes a base, a post extending upwardly from the base along a axial centerline of the post, an arm pivotably coupled to the post to pivot about a first axis perpendicular to the centerline, a cooking platform pivotably coupled to the arm for pivotal movement about a second axis perpendicular to the centerline, a link having a first portion pivotably coupled to the post about a third axis perpendicular to the centerline and a second portion pivotably couple to the cooking platform about a fourth axis perpendicular to the centerline and a retainer selectively retaining the arm in one of a plurality of available angles about the first axis. In one implementation, fire cooking grill additionally comprises a swivel facilitating rotation of the cooking platform about the centerline of the post.

13 Claims, 5 Drawing Sheets

FIRE COOKING GRILL

BACKGROUND

Fire cooking grills are used to suspend or support a cooking platform over and above a fire, such as a campfire, a fire in a fire pit, a fire in a fireplace or a fire in permanent park or campsite grill structure. Existing fire cooking grills are complex, difficult to transport and difficult to adjust. In many circumstances, adjustment of the grill, during cooking, results in the food upon the cooking platform accidentally falling into the fire.

DETAILED DESCRIPTION OF EXAMPLES

Figure 1:
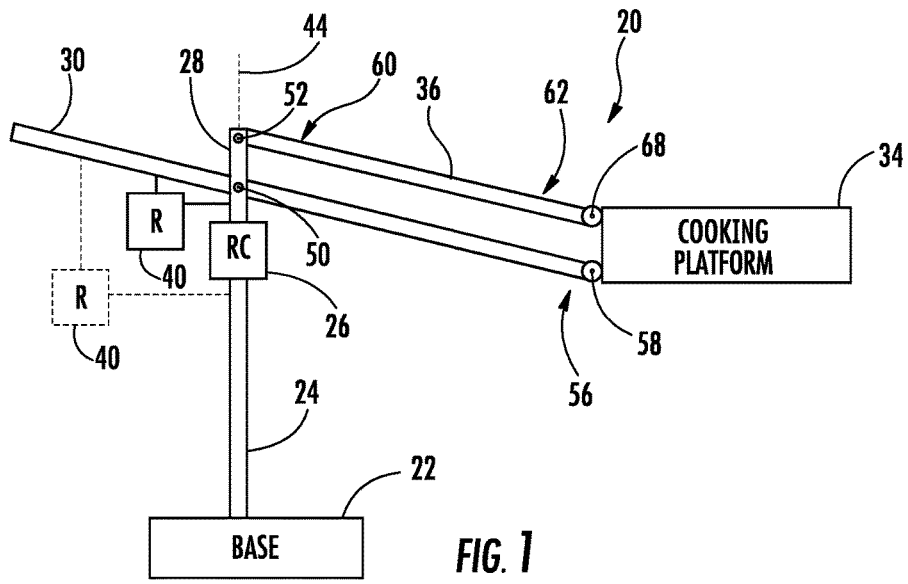
FIG. 1 is a schematic diagram illustrating portions of an example fire cooking grill.

FIG. 1 schematically illustrates an example fire cooking grill 20. As we described hereafter, fire cooking grill 20 is compact and easy to transport. Moreover, fire cooking grill 20 facilitates adjustment of the positioning of a cooking platform in a simple and intuitive manner that may be less likely to result in the food being cooked falling into the underlying fire. Fire cooking grill 20 is especially suited for cooking over an open campfire.

Fire cooking grill 20 comprises base 22, post 24, rotational coupler 26, swivel 28, arm 30, cooking platform 34, wink 36 and retainer 40. Based 22 comprises structure which supports post 24 in a substantially vertical or upright orientation. In one implementation, base 22 comprises at least three, and nominally four, outwardly extending feet that extend along the surface of the underlying terrain upon which grill 20 rests. In other implementations, base 22 may comprise a weighted platform. For example, base 22 may comprise a container filled with sand or water that supports post 24. In yet other implementations, base 22 may comprise one or more ground engaging stakes that are pushed or staked into the underlying ground. In some implementations, base 22 may comprise a clamp or other structure to releasably mount to an existing structure that provides a fire containing chamber. For example, in one implementation, base 22 may comprise a clamp or other device to mount to existing campsite are park grill structure such that post 24 extends above and adjacent to the volume of the structure that is to contain a prepared fire.

Post 24 comprise an upright structure, such as a bar, rod, to or the like extending upward from base 22. Rotational coupler 26 comprise a mechanism rotatably coupling post 24 to swivel 28. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Rotational coupler 26 facilitates rotation of swivel 28 about a vertical axis, such as the vertical centerline 44 of post 24. Rotational coupler 26 facilitates rotation of swivel 28 as well as cooking platform 34 between a first position in which cooking platform 34 overlies the underlying fire, such as for cooking using the fire, and a second position rotated away from the fire in which a cooking platform 34 does not overlie the fire, such as when food is to be placed upon the cooking platform 34, when food is to be inspected or when food is to be removed from the cooking platform 34. In one implementation, rotational coupler 26 comprises a cylindrical bore that receives a cylindrical plug, wherein one of post 24 and swivel 28 includes the cylindrical bore while the other of post 24 and swivel 28 includes the cylindrical plug. In yet other implementations, other bushings, bearings or other mechanisms that facilitate rotation movement of one structure relative to another structure may be employed.

In some implementations, rotational coupler 26 comprises additional means for releasably retaining swivel 28 and a selected angular orientation about centerline 44 with respect to post 24. For example, in one implementation, rotational coupler 26 may include a series of detents or openings within post 24 about centerline 44, wherein swivel 28 is coupled to a pin for selective insertion into one of the plurality of detents to retain swivel 28 in a selected rotational position. In other implementations, rotary coupler 26 may comprise a screwed on clamp which may be screwed to frictionally engage swivel 28 and post 24 to inhibit relative rotation of swivel 28 about the centerline 44 with respect to post 24.

In yet other implementations, rotational coupler 26 may be omitted. In such an implementation, in lieu of being directly connected to or coupled to swivel 28, arm 30 and link 36 would alternatively be directly connected to or coupled to post 24. In such an implementation, retainer 40 (described hereafter, would cooperate with post 24, rather than swivel 28. In such an implementation, cooking platform 34 would not rotate about the centerline 44, but would merely be raised and lowered.

Swivel 28 comprises a structure supported by post 24 and coupled to post 24 so as to rotate about a vertical axis, such as the centerline 44. Swivel 28 pivotably supports arm 30 and link 36 for pivotal movement about two distinct axes 50, 52, respectively, wherein axes 50, 52 extend horizontal or substantially perpendicular to the vertical centerline 44. Although illustrated as a substantially vertical structure, swivel 44 may have a variety of different sizes, shapes and configurations.

Arm 30 comprise elongate structure extending from both sides of axis 50 about which arm 30 pivots. Arm 30 has an end portion 56 pivotally coupled to cooking platform 34 for pivotal movement about axis 58, an axis that is substantially horizontal or perpendicular to the centerline 44. In one implementation, arm 30 has a length between axes 50 and 58 of at least 1 foot. In another implementation, arm 30 has a length between axes 50 and 58 of at least 2 feet. Arm 30 facilitates raising and lowering of cooking platform 34 through pivotal movement of arm 30 about axis 50.

Cooking platform 34 comprises a platform upon which food rests when being cooked over a fire. In one implementation, cooking platform 34 comprises a structure upon which food is directly placed or directly rests. In one implementation, cooking platform 34 comprises a grate having openings or perforations there through. In another implementation, cooking platform 34 comprises a pan or basin upon which food directly rests. In yet other implementations, cooking platform 34 comprise a structure to support other food containing articles, such as pans, pots, kettles and the like. For purposes of this disclosure, the term "food" encompasses both solid and liquid foods.

Link 36 comprises an elongate structure having a first portion 60 pivotably coupled to swivel 28 at axis 52 and a second portion 62 pivotably coupled to cooking platform 34 for rotation about axis 68. Axis 68 is substantially horizontal or perpendicular to the centerline 44 of post 24. Axis 68 is vertically spaced from axis 58. As shown by FIG. 1, the portion of arm 30 between axes 50 and 58, the portion of link 36 between axes 52 and 68, the portion of cooking platform 34 between axes 58 and 68 and the portion of swivel 28 (or the portion of post 24) between axes 50 and 52 form a four bar linkage. The four bar linkage maintains an orientation of cooking platform 34 when being raised and lowered through the pivoting of arm 30 about axis 50. In the example illustrated, the four bar linkage maintains cooking platform 34 in a substantially horizontal orientation, perpendicular to the vertical axis of post 24, inhibiting food upon cooking platform 34 from dripping, rolling, sliding or otherwise accidentally falling from cooking platform 34.

Retainer 40 comprises a mechanism to selectively retain arm 30 in one of a plurality of different available angles about axis 50. In the example illustrated, retainer 40 is connected to arm 30 and swivel 28 to lock or secure arm 30 in an angular position relative to swivel 28. As shown by broken lines, in other implementations, retainer 40 may alternatively be connected to arm 30 and post 24 to lock or secure arm 30 in a selected angular position about axis 50. In one implementation, retainer 40 comprises a pin that is releasably positioned within the corresponding opening or detent. In yet another implementation, retainer 40 may comprise a flexible line, cable, wire or the like having first and secured to arm 30 and a second and releasably secured to swivel 28 or post 24 at a selected one of a plurality of available connection points vertically along swivel 28 or post 24. In still other implementations, retainer 40 comprises a flexible line, cable, wire or the like having a first and secured to one of swivel 28, post 24 or based 22 and a second end releasably secured to arm 30 at a selected one of a plurality of available connection points along arm 30. Although retainer 40 is illustrated as being on the left side of axis 50, in other implementations, retainer 40 may alternatively be located on the right side of axis 50 (as seen in FIG. 1).

Figure 2:
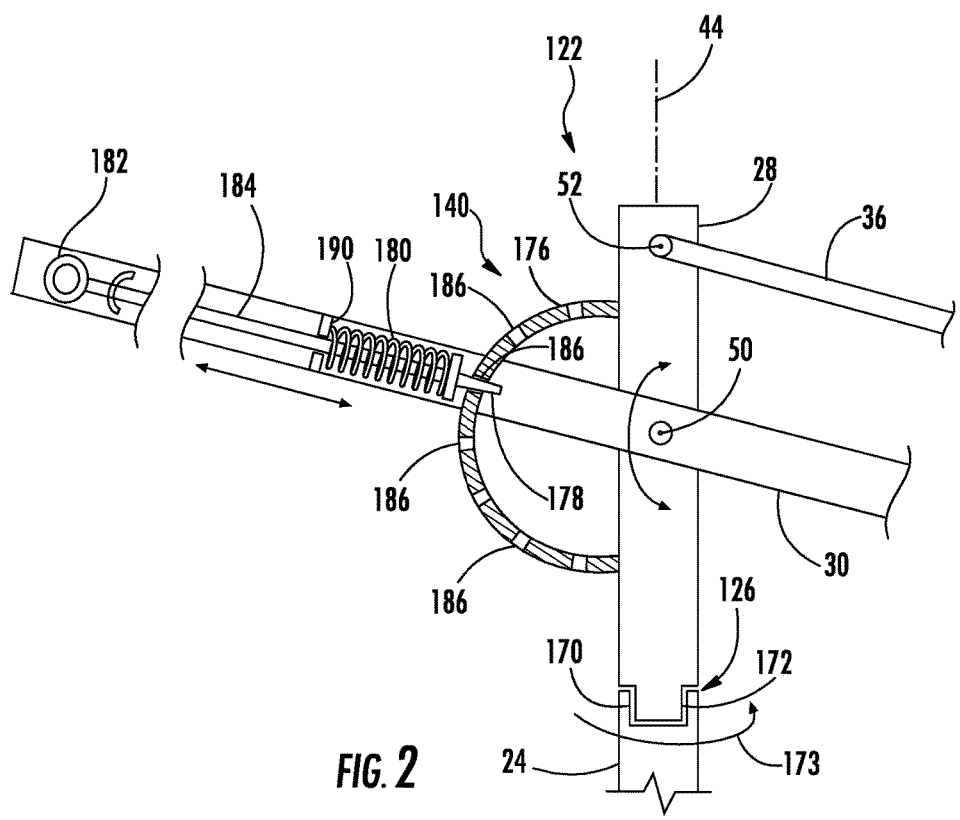
FIG. 2 is a fragmentary view illustrating portions of another example fire cooking grill.
Figure 3:
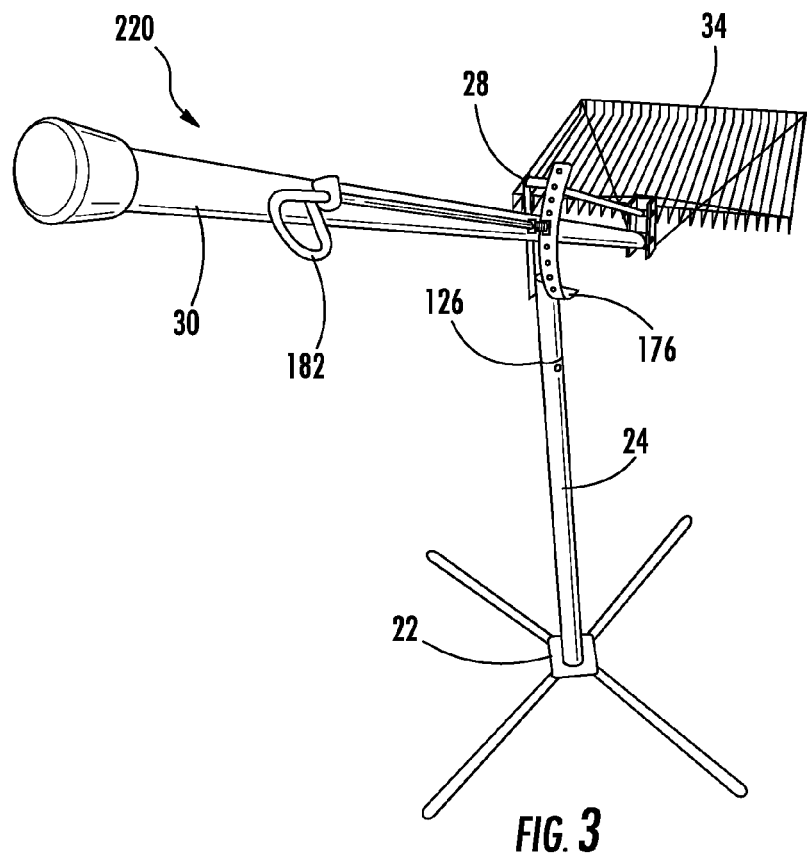
FIG. 3 is a perspective view of another example fire cooking grill in a first vertical position.
Figure 4:
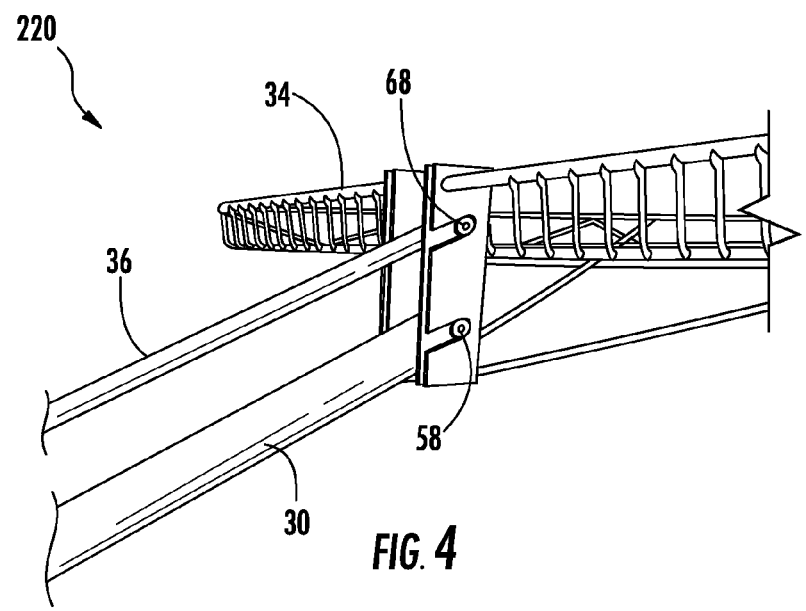
FIG. 4 is a perspective view of the fire cooking grill of FIG. 3 in a second vertical position.
Figure 5:
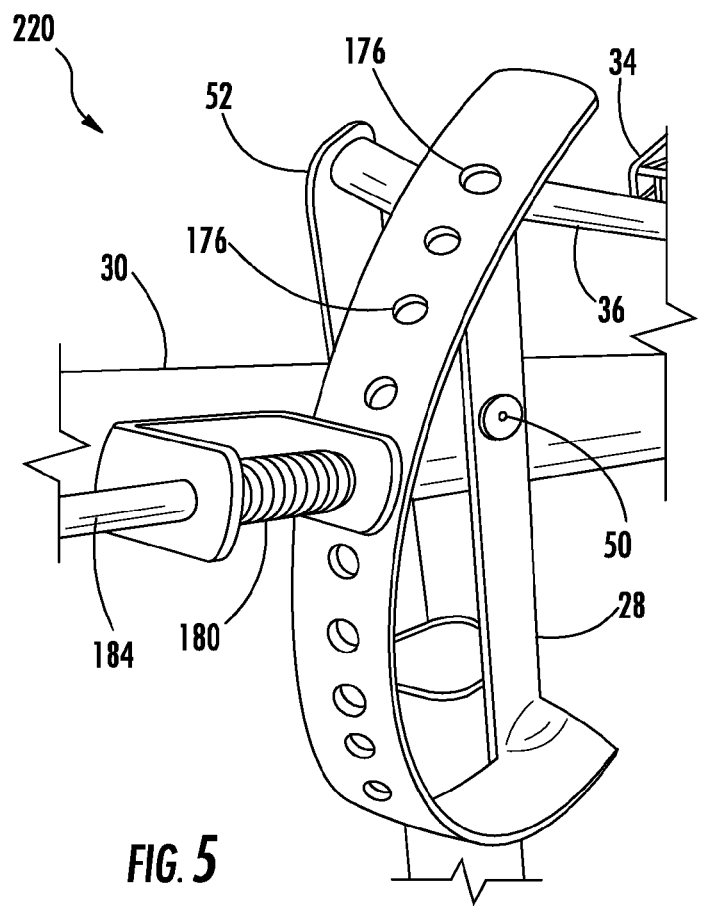
FIG. 5 is an enlarged fragmentary perspective view of a portion of the fire cooking grill of FIG. 3.
Figure 6:
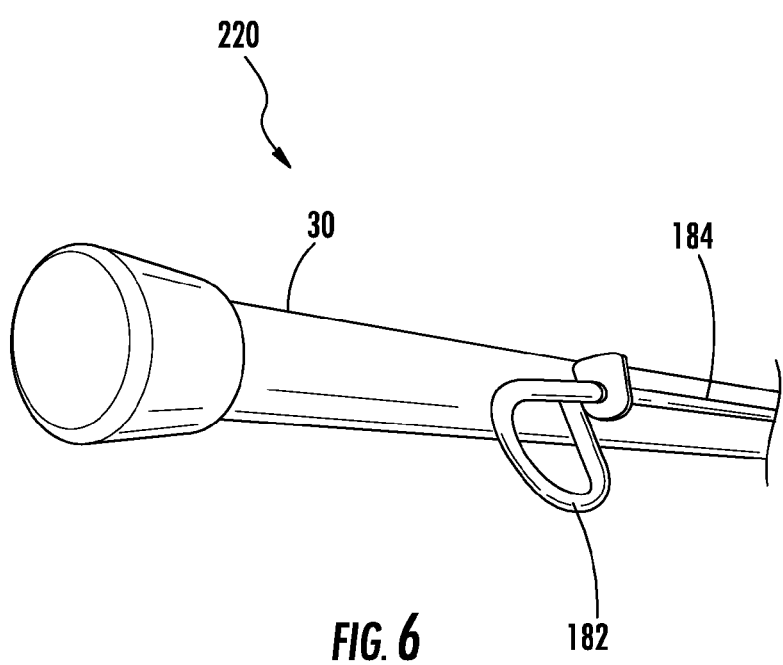
FIG. 6 is an enlarged fragmentary perspective view of another portion of the fire cooking grill of FIG. 3.

FIG. 2 illustrates fire cooking grill 120, a particular implementation of fire cooking grill 20. For ease of illustration, those components of fire cooking grill 120 which correspond to components of fire cooking grill 20 are numbered similarly. As with fire cooking grill 20, fire cooking grill 120 comprises base 22 and cooking platform 34 described and illustrated with respect to FIG. 1. Fire cooking grill 120 is similar to fire cooking grill 20 except the fire cooking grill 120 specifically comprises rotational coupler number 126 and retainer 140, examples of rotational coupler 26 and retainer 40, respectively.

Rotational coupler 126 rotatably supports swivel 28 for rotation about a vertical centerline 44 of post 24. Rotational copper 126 comprises a cylindrical bore 170 formed in an upper portion of post 24 and a cylindrical plug 172 formed a lower portion of swivel 28. Bore 170 receives plug 172. Plug 170 to rotate within four 170 about the centerline 44 as indicated by arrow 173. Although not illustrated, in some implementations, additional bushings, bearings or other structures may be provided to further facilitate rotational movement of plug 172 within four 170. In some implementations, post 24 may alternatively include plug 172 while swivel 28 includes bore 170. In one implementation, one of post 24 and swivel 28 may comprise a hollow tube that receives the end of a hollow tube providing the other of post 24 and swivel 28.

Retainer 140 selectively retained arm 30 and one of a plurality of available angles about axis 50. Retainer 140 comprises band 176, pin 178, bias 180, handle 182 and coupler 184. Band 176 comprises an arcuate band centered about axis 50 and providing a plurality of distinct spaced detents 186 about axis 50. In the example illustrated, each of detents 186 comprises an opening extending completely through band 176. In other implementations, each of detents 26 may comprise a crater, dimple or depression into which pin 178 may be received. Each of detents 186 comprises a distinct location which provides a distinct angular orientation of arm 30 and a distinct vertical height of cooking platform 34 (shown in FIG. 1).

Pin 178 comprises a rod, or other projection configured to be received within a selected one of detents 186. Pin 178 is carried by arm 30 and is movable between a detent engaging position and a detent withdrawn position. Bias 180 comprise a structure carried by arm 130 (or by band 176 or swivel 28) that resiliently biases pin 178 towards a detent engaging position. In the example illustrated, bias 180 comprises a compression spring captured between a head of pin 178 and a shoulder structure 190 of arm 30.

In the example illustrated, the openings or detents 186 of band 176 extend along axes lying in a plane perpendicular to axis 50. In other implementations, band 176 may comprise a band or may comprise a plate having detents arranged in an arc about axis 50, but with the detents or openings extending along axes that are each parallel to axis 50. In yet other implementations, retainer 140 may omit detents 186 and may alternatively comprise a caliper, pad, or other structure that moves in and out of frictional engagement with band 176 or a plate to retain arm 30 at a selected angular position about axis 50. In such an implementation, the caliper, pad or other structure frictionally bears against (rather than being received within a detent) an opposite surface of the band or plate (replacing band 176) when engaged with the band or plate to inhibit pivotal movement of arm 30 about axis 50. In such an implementation, arm 30 is supportable at a selected one of a continuum of angular orientations about axis 50 rather than various discrete or distinct predefined angular positions about axis 50.

Handle 182 comprises a structure operably coupled to pin 178 so as to move pin 178 against bias 180 from a detent engaging position to a detent withdrawn position, allowing arm 30 to pivot about axis 50 to a different angular position. Handle 182 is operably coupled to pin 178 by coupler 184.

In the example illustrated, coupler 184 comprises a rod extending from handle 182, through bias 180, to pin 178. In other implementations, coupler 184 may have other configurations. For example, in other implementations, coupler 184 may comprise a Bowden cable, a cable or wire is movable through and within a fixed are stationary sheath or sleeve, wherein the movable wire of the Bowden cable has a first and secured to handle 182 and a second end secured to pin 178.

Figure 8:
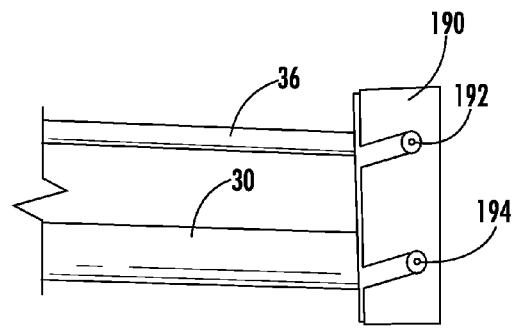
FIG. 8 is a fragmentary perspective view of a portion of the example fire cooking grill of FIG. 3.
Figure 9:
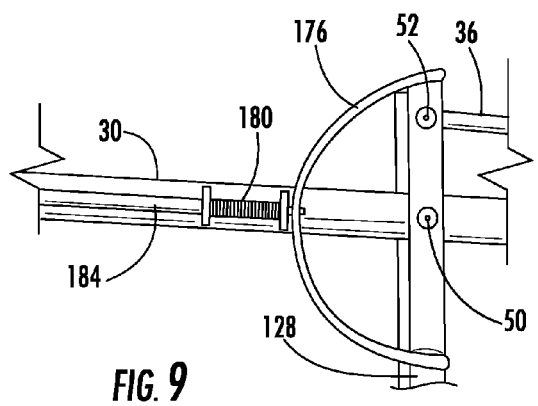
FIG. 9 is an enlarged perspective view of another portion of the example fire cooking grill of FIG. 3.
Figure 10:
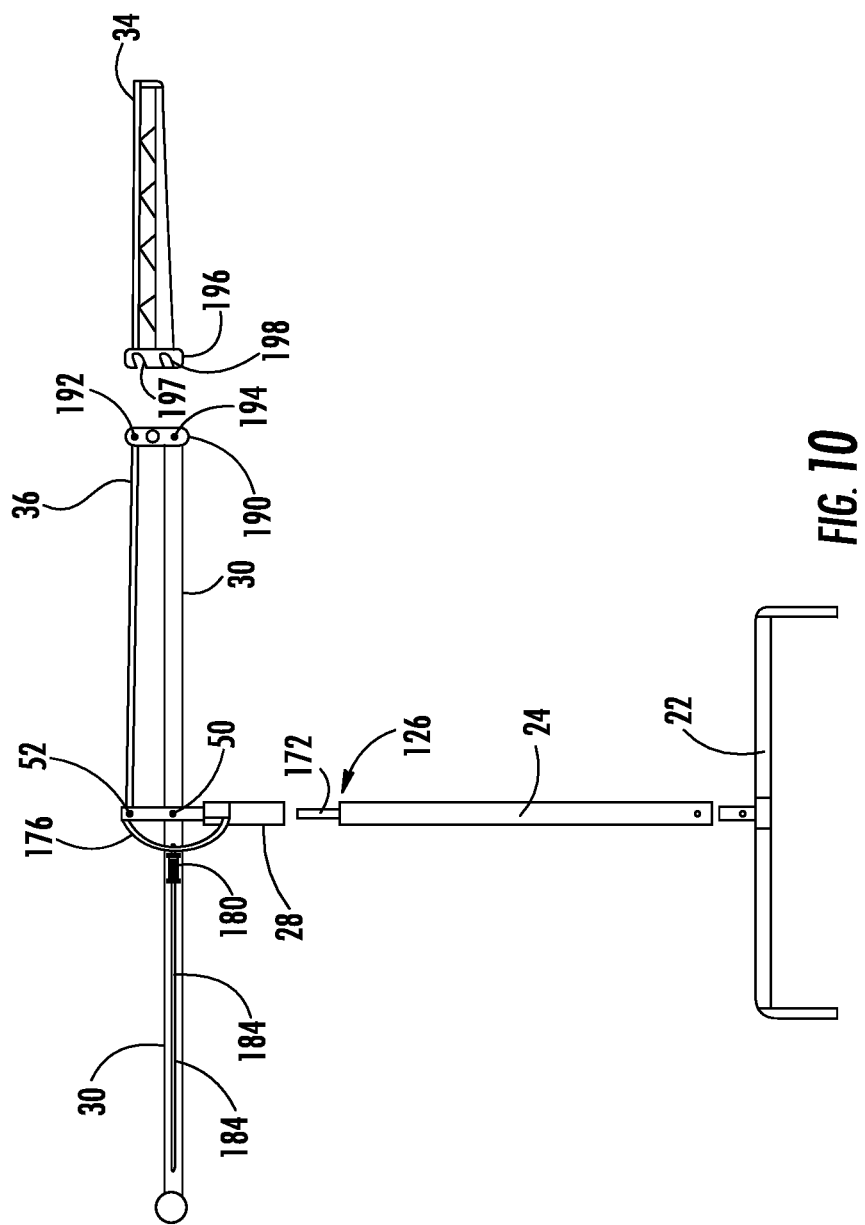
FIG. 10 is a partially exploded sideview of the example fire cooking grill of FIG. 3.

FIGS. 3-10 illustrate fire cooking grill 220, an example implementation of fire cooking grill 120 described above. Grill 220 has a cooking platform 34 that moves between a lowered position in which the cooking platform 34 is spaced from the underlying terrain upon which grill 220 rests by a distance of 11 inches and a fully raised position in which the cooking platform 34 is spaced from the underlying terrain upon which grill 220 rests by a distance of 47 inches, all while platform 34 is substantially level. FIG. 10 is a partially exploded view of fire cooking grill 220. Those components of fire cooking grill 220 which correspond to components of fire cooking grills 120 and 20 are numbered similarly.

Figure 7:
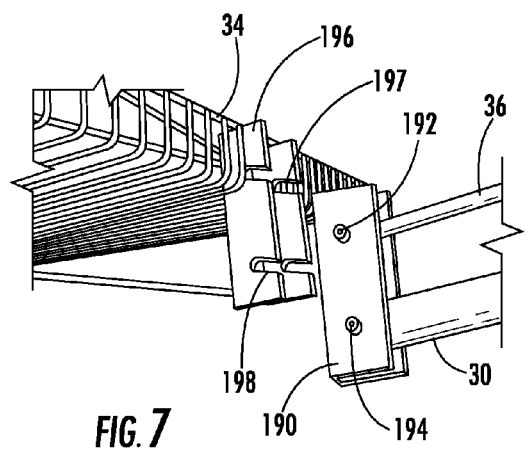
FIG. 7 is an enlarged fragmentary perspective view of the example fire cooking grill of FIG. 3, illustrating separation of an example cooking platform from an example arm.

FIGS. 7-9 illustrate the releasable connection of cooking platform 34 to arm 30 and link 36. As shown by FIGS. 7-9, arm 30 and link 36 are interconnected by a bar 190 having outwardly projecting pins 192, 194. In one implementation, pin 192 pivots and rotates with arm 36 while pin 194 pivots and rotates with arm 30 about pivot axes 52 and 50, respectively. In other implementations, pins 192 and 194 are separate and distinct from arm 30 and link 36. For example, in other implementations, pins 192, 194 may comprise knobs or other structures welded to or extending from opposite exterior sides of bar 190, wherein separate pivoting structures, such as pins or rods, pivotally connect arm 30 and link 36 to bar 190.

As shown by FIG. 7, cooking platform 34 is connected to sleeve 196 having slots 197, 198. In the example illustrated, slots 187, 98 extend at an angle downwardly and rearwardly from cooking platform 34. Sleeve 196 is sized and shaped to wrap about bar 192 with slots 197, 198 slidably and removably receiving pins 192, 194, respectively, extending from opposite sides of bar 190. As a result, cooking platform 34 may be simply lowered onto pins 192, 194 or lifted from pins 192, 194 for cleaning, repair or replacement (as shown by FIG. 10). In other implementations, cooking platform 34 may be removably or releasably connected to bar 190 and/or arm 30, link 36 by other mechanisms. It still other implementations, cooking platform 34 may be fixedly or permanently affixed or connected to bar 190, which may be part of cooking platform 34.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A fire cooking grill comprising:
   a base;
   a post extending upwardly from the base along a axial centerline of the post;
   an arm pivotably coupled to the post to pivot about a first axis perpendicular to the centerline;
   a cooking platform pivotably coupled to the arm for pivotal movement about a second axis perpendicular to the centerline;
   a link having a first portion pivotably coupled to the post about a third axis perpendicular to the centerline and a second portion pivotably couple to the cooking platform about a fourth axis perpendicular to the centerline;
   a retainer selectively retaining the arm in one of a plurality of available angles about the first axis, wherein the retainer comprises: an arcuate band having detents therealong; and a pin carried by the arm for insertion into a selected one of the detents, wherein the pin is movable between a detent engaging position and a detent withdrawn position, and wherein the fire cooking grill further comprise a bias resiliently biasing the pin towards the detent engaging position; and
   a rod coupled to the pin and having a longitudinal dimension extending along the arm, the rod including a handle to facilitate pulling of the rod to move the pin against the bias to move the pin to the detent withdrawn position.

2. The fire cooking grill of claim 1, wherein the cooking platform comprises a cooking grate.

3. The fire cooking grill of claim 1 further comprising a swivel rotatably coupling the arm to the post for rotation about an axial centerline of the post, wherein the arm is pivotably coupled to the swivel for pivotal movement about the second axis perpendicular to the centerline and wherein the first portion of the link is pivotably coupled to the swivel about the third axis perpendicular.

4. The fire cooking grill of claim 3, wherein the retainer comprises:
   an arcuate array of detents; and
   a pin carried by the arm for insertion into a selected one of the detents.

5. The fire cooking grill of claim 4, wherein the pin is movable between a detent engaging position and a detent withdrawn position and wherein the fire cooking grill further comprise a bias resiliently biasing the pin towards the detent engaging position.

6. The fire cooking grill of claim 5 further comprising a rod coupled to the pin and extending along the arm, the rod including a handle to facilitate pulling of the rod to move the pin against the bias to move the pin to the detent withdrawn position.

7. The fire cooking grill of claim 3, wherein the cooking platform comprises a cooking grate.

8. The fire cooking grill of claim 3, wherein one of the swivel and the post comprises a cylindrical plug and the other of the swivel the post comprises a cylindrical bore receiving the cylindrical plug.

9. The fire cooking grill of claim 1, wherein one of the swivel and the post comprises a cylindrical plug and the other of the swivel the post comprises a cylindrical bore receiving the cylindrical plug.

10. The fire cooking grill of claim 1, wherein the base comprises at least 3 feet coupled to and extending outwardly from the post.

11. The fire cooking grill of claim 1, wherein the cooking platform is removably coupled to the arm and the link.

12. A fire cooking grill comprising:
a vertical support portion;
a turning portion coupled to the vertical support portion to rotate about a vertical axis;
a cooking platform;
a link pivotably coupled at a first end of the link to the turning portion and at a second end of the link to the cooking platform;
an arm pivotably coupled at a first portion of the arm to the cooking platform and at a second portion of the arm to the turning portion, wherein the turning portion, the cooking platform, the arm and the link form a four bar linkage such that pivotal movement of the arm vertically moves the cooking platform while an orientation of the cooking platform is maintained;
a retaining mechanism to inhibit pivoting movement of the arm to retain the cooking platform at a selected height, wherein the retaining mechanism comprises: an arcuate band having detents therealong; and a pin carried by the arm for insertion into a selected one of the detents, wherein the pin is movable between a detent engaging position and a detent withdrawn position, and wherein the fire cooking grill further comprise a bias resiliently biasing the pin towards the detent engaging position; and
a rod coupled to the pin and having a longitudinal dimension extending along the arm, the rod including a handle to facilitate pulling of the rod to move the pin against the bias to move the pin to the detent withdrawn position.

13. The fire cooking grill of claim 12, wherein the cooking platform comprises a cooking grate.

* * * * *